Sept. 26, 1933.     A. H. TINNERMAN     1,928,468
FASTENING DEVICE
Filed March 12, 1932     2 Sheets-Sheet 1
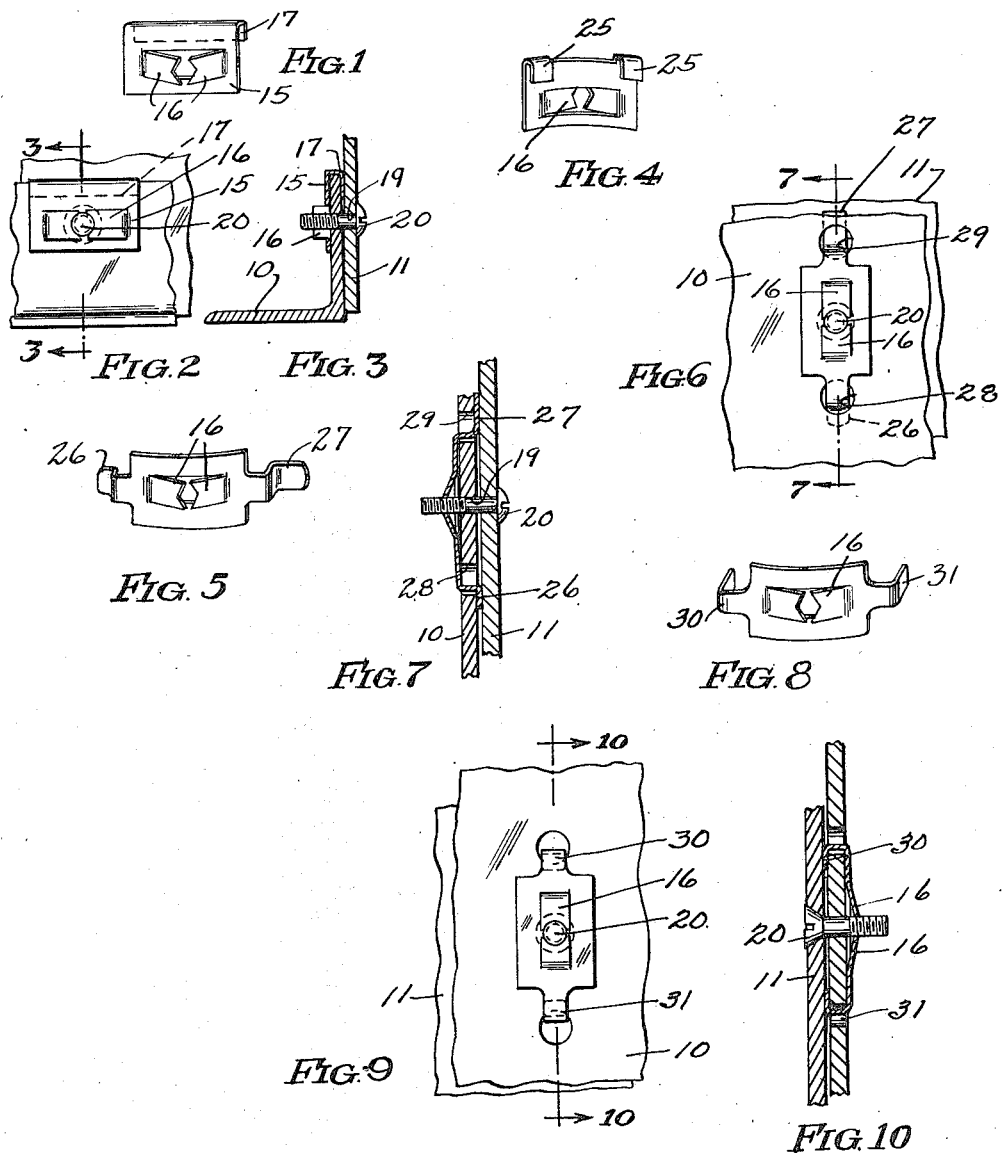

Sept. 26, 1933.    A. H. TINNERMAN    1,928,468
FASTENING DEVICE
Filed March 12, 1932    2 Sheets-Sheet 2
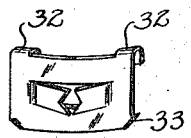
FIG. 11
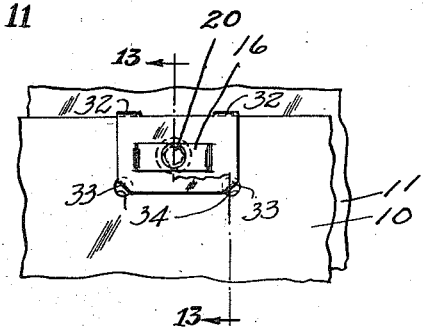
FIG. 12
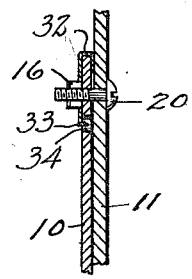
FIG. 13
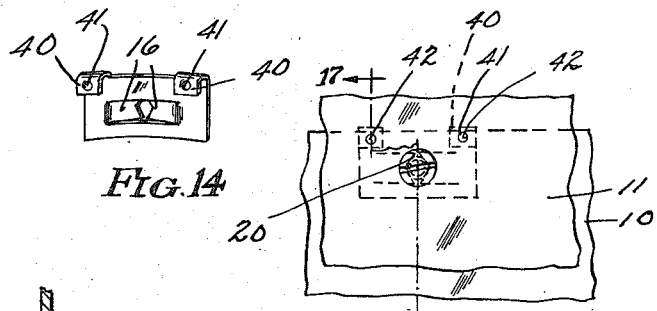
FIG. 14
FIG. 15
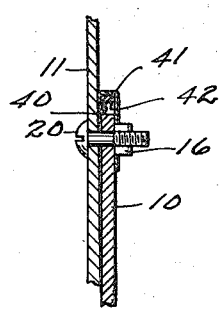
FIG. 17    FIG. 16
Inventor
Albert H. Tinnerman
By Bates Goliek & Teare
Attorneys Patented Sept. 26, 1933

1,928,468

UNITED STATES PATENT OFFICE 1,928,468

FASTENING DEVICE

Albert H. Tinnerman, Cleveland, Ohio

Application March 12, 1932. Serial No. 598,391

6 Claims. (Cl. 85—32)

This invention relates to nut and bolt devices, and particularly to those which are used for fastening together two parts in which, by reason of the relationship between them, the nut cannot be held by the operator while the bolt is being turned. Constructions of this character are present in the manufacture of hollow articles, such as, for example, stoves, refrigerator cabinets, metal furniture, automobile bodies and the like.

The articles referred to usually have a smooth exterior appearance, and when assembled usually have a box-like construction in which the nut is disposed inside the article while the bolt projects through the wall and engages the nut. To hold the nut in proper position for receiving the bolt and also from turning, the practice has been to use an auxiliary part which is drilled and tapped at spaced intervals in registration with the bolt openings in the wall of the article. Such extra piece has been rigidly fastened to the inner wall of the article before the closing panel has been fastened into place. This procedure is not only expensive, but is objectionable, for the reason that difficulty is frequently experienced in obtaining satisfactory registration between the threaded openings and the bolt receiving openings in the wall.

An object of my invention is to provide a fastening device in the form of a nut, which may be detachably fitted onto one of the parts to be joined, and which may operate to guide the bolt automatically into the proper position for coupling purposes, and which will operate to lock the bolt merely by lengthwise movement thereof through the opening and by the application of one or two turns thereto.

My invention contemplates different forms of construction for carrying out the desired object so in the drawings, I have illustrated various modifications. For example, Fig. 1 is a perspective view of a fastening device embodying one form of my invention; Fig. 2 is an elevation of the device shown in Fig. 1, as applied to parts that are intended to be joined together; Fig. 3 is a section on the line 3—3 in Fig. 2; Fig. 4 is a perspective view of a modified form of my invention; Fig. 5 is a perspective view of another modification; Fig. 6 is an elevation of the device shown in Fig. 5, as applied to parts that are intended to be connected together; Fig. 7 is a section taken on the line 7—7 in Fig. 6; Fig. 8 is a perspective view of still another modification; Fig. 9 is an elevation of the device shown in Fig. 8 as applied to parts to be joined together; Fig. 10 is a section taken on the line 10—10 in Fig. 9; Fig. 11 is a perspective view of a further modification; Fig. 12 is an elevation of the device shown in Fig. 11 as applied to the parts to be joined together, and Fig. 13 is a section taken on the line 13—13 in Fig. 12; Fig. 14 is a perspective view of another form of the device; Fig. 15 is a front elevation of the device shown in Fig. 14 as applied to parts to be joined together; Fig. 16 is an elevation of one of the parts used in Fig. 15; Fig. 17 is a section taken on the lines 17—17 in Fig. 15.

My invention in its application in the various figures is illustrated as connecting together two parts, such as an angle bar 10 and a plate 11. These are merely illustrative of the use to which the invention may be put and they show conditions which frequently arise in the manufacture of articles hereinbefore enumerated.

Considering first the illustration of Fig. 1, the invention is shown in the form of a clip which has a body portion 15 that is approximately rectangular in shape and that has prongs 16 extending upwardly therefrom, and in opposing relation. A flange 17 is shown as extending along one longitudinal edge of the clip and as being spaced therefrom a distance sufficiently far to admit the edge of one of the parts with which the clip is intended for use. For example, the flange is shown as extending over the leg 18 of the angle plate 10 and as having the opening between the prongs disposed in alignment with the opening 19 through which the bolt 20 extends. The prongs face away from the openings and therefore serve to guide and admit the bolt during the assembly operation. The clip is tempered so that the prongs possess spring-like characteristics, which react against the movement imparted thereto by the entering of the bolt, and thereby frictionally engage the bolt threads with sufficient pressure to hold it, and thereafter to lock it when the bolt is given a few turns.

The important advantage of the invention illustrated in Fig. 1 is that the clip may be slipped over the edge of the part 10 and frictionally held in the desired position by the spring-like characteristics of the metal. To this end the spacing of the flange from the body is predetermined in accordance with the thickness of the material on which the clip is used. In each case the flange and clip are intended to have a snug fit with the coacting part, so that unnecessary precaution need not be taken to prevent the clip from falling off during the assembly operation.

The modification shown in Fig. 4 utilizes spaced flanges 25 adjacent the end of one of the longitudinal edges of the clip. This arrangement in some cases is preferable to that shown in Fig. 1 particularly where it is desirable to have the clip arched lengthwise so as either to impart greater locking strength, or to conform to irregularities in the parts to which the clip is intended to be attached.

In Fig. 5 I have shown a modification, which is intended not only to hold the clip in the desiring bolt receiving position, but also to center it automatically with reference to the bolt opening when it is applied to the coacting part. To this end, the clip is shown as having tabs 26 and 27 which project from each end thereof. The tab 26 is somewhat shorter than the tab 27, and if desired, the body of the clip may be arched longitudinally in the manner heretofore described. To use the clip of Fig. 5, I provide openings 28 and 29 in the part 10 in addition to the usual bolt opening 19. In practice, the tab 27 is inserted in the opening 29 and is moved sufficiently far in the opening to admit the tab 26 in the opening 28. The two openings may be so positioned with reference to each other that slight pressure is required to force the tab into place. Thereafter, when the bolt is driven through the clip it is apparent that it is rigidly locked in position in proportion to the degree to which the bolt is turned.

The modification of Fig. 8 also has tabs which are disposed in a position similar to that shown in Fig. 5. They are identified by the reference characters 30 and 31 respectively. They differ from the tabs 26 and 27 in that they are intended to be snapped through the openings 28 and 29 and then bent over into contact with the face of the part 10, which is opposite to that on which the clip is positioned. By allowing a sufficient degree of arch in a longitudinal direction to the clip, the ends of the tabs 30 and 31 may be bent before inserting them in the openings in the part 10, and thus it is possible to obtain satisfactory locking action merely by snapping the clip into place.

The modification of Fig. 11 embodies the spaced flanges 32, which correspond to the flanges 25 of Fig. 4 with the added feature of prongs 33, which extend inwardly at the corners of the clip and adjacent the opposite longitudinal edge thereof. Suitable openings 34 in the part 10 are intended to receive the prongs after the flanges 32 are forced into place. This is shown particularly in Figs. 12 and 13.

The modification shown in Fig. 14 embodies spaced flanges 40 which correspond to the flanges 32 and 25 of Figs. 4 and 11, respectively. In this form, however, each flange 40 is provided with an embossed button 41 arranged to engage preformed openings 42 in the member 10 to prevent displacement of the clip, as shown in Figs. 15 and 17.

From the foregoing description it will be apparent that I have provided a clip which may be automatically positioned on one part and held thereagainst, whereby a bolt may be inserted through the part and locked to the clip merely by moving it in a longitudinal direction and impart one or two turns thereto. It is also apparent that a clip having the characteristics of my invention is well suited for locking together those parts which are used for constructing hollow articles, wherein the structure is completely closed by the attachment of the last panel. The clips are all sheet metal stampings, and may therefore be economically manufactured and expeditiously attached in use.

I claim:

1. A nut comprising a substantially flat strip having bolt receiving prongs struck upwardly therefrom adjacent the midportion thereof, and a material gripping flange disposed along one of the edges and extending from the body in a direction opposite to that in which the prongs extend, and continued into a portion bent into parallelism with the body whereby the bent portion operates to hold the nut in self-sustaining bolt receiving position.

2. In combination, a part to be joined, a nut comprising a relatively thin sheet metal strip having a yieldable bolt receiving portion therein, said part having a bolt receiving opening in registration with said portion, and having a different opening in the region of the nut means for supporting the nut on said part, said nut having a portion thereof extending into the last named opening for holding it in bolt receiving position on the part, and for automatically centering the nut in registration with the bolt opening prior to the insertion of the bolt therethrough.

3. A nut comprising a strip of relatively thin metal, yieldable bolt engaging prongs thereon, and means on the nut for automatically positioning it in bolt receiving position on a part to be joined, said means including a flange on one side of the nut and a prong on the opposite side of the nut.

4. A nut comprising a strip of relatively thin metal having a yieldable bolt receiving portion therein, means integral with the nut for retaining it in contact with a part to be joined, and means integral with the nut and arranged to engage openings in the part to center the nut in registration with the bolt opening in the part.

5. A nut comprising a strip of relatively thin metal having a yieldable bolt receiving portion therein, a material gripping flange disposed along one of the edges to maintain a part to be joined in contact with the nut, and a projection on said flange to engage an opening in the part to center the nut in registration with the bolt opening in the part.

6. In combination, a part to be joined having openings therein, a nut comprising a strip of relatively thin material having yieldable prongs adjacent the mid portion thereof and having preformed tabs of unequal length projecting from the ends thereof, said tabs passing through said openings and engaging the part to be joined to hold the nut in self sustaining bolt receiving position.

ALBERT H. TINNERMAN.